United States Patent
Hikawa et al.

(10) Patent No.: US 7,265,954 B2
(45) Date of Patent: Sep. 4, 2007

(54) METHOD FOR ESTIMATING DC MOTOR COIL TEMPERATURE, DC MOTOR CONTROL METHOD AND THEIR DEVICES

(75) Inventors: Takeshi Hikawa, Sakai (JP); Satoshi Ishikawa, Sakai (JP); Yasuto Yanagida, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 10/576,769

(22) PCT Filed: Oct. 22, 2004

(86) PCT No.: PCT/JP2004/015680

§ 371 (c)(1),
(2), (4) Date: Apr. 21, 2006

(87) PCT Pub. No.: WO2005/041397

PCT Pub. Date: May 6, 2005

(65) Prior Publication Data

US 2007/0070560 A1    Mar. 29, 2007

(30) Foreign Application Priority Data

Oct. 24, 2003   (JP)   ............................. 2003-365130
Jan. 13, 2004   (JP)   ............................. 2004-004905

(51) Int. Cl.
  *H02H 5/04*   (2006.01)
  *H02H 7/08*   (2006.01)

(52) U.S. Cl. .................. 361/29; 318/471; 318/806; 318/490; 361/28; 361/23

(58) Field of Classification Search ................ 318/471, 318/806, 490; 361/29, 28, 23
See application file for complete search history.

(56) References Cited

U.S. PATENT DOCUMENTS

| | | | |
|---|---|---|---|
| 4,780,658 A * | 10/1988 | Koyama ..................... 318/808 |
| 4,897,584 A * | 1/1990 | Grutzmacher et al. ...... 318/471 |
| 5,510,687 A * | 4/1996 | Ursworth et al. ........... 318/727 |
| 6,700,400 B2 * | 3/2004 | Atarashi ..................... 324/772 |
| 6,753,665 B2 * | 6/2004 | Ueda et al. ................. 318/135 |
| 2002/0113615 A1 * | 8/2002 | Atarashi ..................... 324/772 |
| 2003/0164691 A1 * | 9/2003 | Ueda et al. ................. 318/135 |
| 2005/0247073 A1 * | 11/2005 | Hikawa et al. ............. 62/228.1 |

FOREIGN PATENT DOCUMENTS

| | | |
|---|---|---|
| EP | 1 312 932 | 5/2003 |
| JP | 1-248927 A | 10/1989 |
| JP | 2002-22813 A | 1/2002 |
| JP | 2002-367307 A | 12/2002 |
| JP | 2003-009589 A | 1/2003 |

\* cited by examiner

*Primary Examiner*—Rita Leykin
(74) *Attorney, Agent, or Firm*—Global IP Counselors

(57) ABSTRACT

Resistance of the coil of a DC motor is calculated by using the motor current and the motor voltage, and the coil temperature is estimated by using the resistance-temperature characteristics of the coil.

10 Claims, 11 Drawing Sheets

(A) output characteristics (representative example)

(B) forward characteristics of a diode section (representative example)

METHOD FOR ESTIMATING DC MOTOR COIL TEMPERATURE, DC MOTOR CONTROL METHOD AND THEIR DEVICES

CROSS-REFERENCE TO RELATED APPLICATIONS

This U.S. National stage application claims priority under 35 U.S.C. §119(a) to Japanese Patent Application No. 2003-365130, filed in Japan on Oct. 24, 2003 and Japanese Patent Application No. 2004-004905, filed in Japan on Jan. 13, 2004. The entire contents of these Applications are hereby incorporated herein by reference.

BACKGROUND OF THE INVENTION

1. Field of the Invention

The present invention relates to a method for estimating DC (Direct Current) motor coil temperature without using a temperature sensor, a DC motor control method based upon an estimated coil temperature, and their devices.

2. Description of Related Art

From the past, an air conditioner device comprises a compressor driven by a motor. Therefore, a disadvantage is necessarily prevented from occurrence such that oil is diluted so as to cause burning in. For this reason, it is required that a temperature in an interior of a compressor is detected as an indicator to which extent preheating driving is to be carried out.

When a temperature in an interior of a compressor is measured by inserting a thermocouple or the like in the interior of the compressor for realizing the demand, great increase in cost is caused. Therefore, it is proposed and practiced that a temperature of an outlet pipe of a compressor is detected and a temperature in an interior of the compressor is estimated from the detected temperature.

When a method is employed for estimating a temperature in an interior of a compressor from a temperature of an outlet tube of the compressor, a disadvantage arises in that a temperature estimation error becomes greater for a case where the compressor is stopped and is applied preheating driving or the like.

To dissolve the disadvantage, a thermistor may be provided for directly measuring a temperature of a body of a compressor. In this case, increase in cost is caused.

Similar disadvantages arise for other devices each driven by a motor.

BRIEF SUMMARY OF THE INVENTION

The present invention was made in view of the above problems.

It is an object of the present invention to offer a method and device thereof which can estimate a DC motor coil temperature with accuracy without increase in cost.

It is another object of the present invention to offer a method for driving a DC motor based upon an estimated temperature and a device thereof.

A method for estimating DC motor coil temperature of a first aspect of the present invention calculates a resistance of the coil of a DC motor by using the motor current and the motor voltage, and estimates the coil temperature by using the resistance-temperature characteristics of the coil, in a motor driving system in which an output of an inverter is supplied to the DC motor.

A method for estimating DC motor coil temperature of a second aspect of the present invention calculates a resistance of the coil of a DC motor by using a duty difference and a current difference by using a plurality of duties.

A method for estimating DC motor coil temperature of a third aspect of the present invention employs fixed coordinate system and applies a voltage with an electrical angle determined to be a constant angle.

A method for estimating DC motor coil temperature of a fourth aspect of the present invention maintains a constant duty for equal to or greater than at least 0.5 seconds.

A method for estimating DC motor coil temperature of a fifth aspect of the present invention detects a motor current by using a shunt resistor, and calculates a coil resistance at a carrier frequency lower than that for DC motor driving.

A method for estimating DC motor coil temperature of a sixth aspect of the present invention employs a DC motor which is provided in the interior of a casing of a compressor, for driving the compressor, as the DC motor.

A DC motor control method of a seventh aspect of the present invention sets a DC motor temperature to be a predetermined temperature based upon the coil temperature estimated by one of the methods of the first to sixth aspects.

A DC motor control method of an eighth aspect of the present invention sets a time interval till starting of a DC motor based upon the coil temperature estimated by one of the methods of the first to sixth aspects.

A DC motor control method of a ninth aspect of the present invention sets driving and controlling method for a DC motor based upon the coil temperature estimated by one of the methods of the first to sixth aspects.

A device for estimating DC motor coil temperature of a tenth aspect of the present invention comprises a motor driving system in which an output of an inverter is supplied to a DC motor, wherein the system comprises a coil temperature estimating means which comprise means for calculating a resistance of the coil of the DC motor by using a motor current and a motor voltage, and means for estimating a coil temperature by using the resistance-temperature characteristics of the coil.

A device for estimating DC motor coil temperature of an eleventh aspect of the present invention employs means for calculating a resistance of the coil of a DC motor by using a duty difference and a current difference by using a plurality of duties, as the coil temperature estimating means.

A device for estimating DC motor coil temperature of a twelfth aspect of the present invention employs means for employing fixed coordinate system and for applying a voltage with an electrical angle determined to be a constant angle, as the coil temperature estimating means.

A device for estimating DC motor coil temperature of a thirteenth aspect of the present invention employs means for maintaining a constant duty for equal to or greater than at least 0.5 seconds, as the coil temperature estimating means.

A device for estimating DC motor coil temperature of a fourteenth aspect of the present invention employs means for detecting a motor current by using a shunt resistor, and for calculating a coil resistance at a carrier frequency lower than that for DC motor driving, as the coil temperature estimating means.

A device for estimating DC motor coil temperature of a fifteenth aspect of the present invention employs a DC motor which is provided in the interior of a casing of a compressor, for driving the compressor, as the DC motor.

A DC motor control device of a sixteenth aspect of the present invention comprises control means for setting a DC motor temperature to be a predetermined temperature based upon the coil temperature estimated by one of the devices of the tenth to fifteenth aspects.

A DC motor control device of a seventeenth aspect of the present invention comprises control means for setting a time interval till starting of a DC motor based upon the coil temperature estimated by one of the devices of the tenth to fifteenth aspects.

A DC motor control device of an eighteenth aspect of the present invention comprises control means for setting driving and controlling method for a DC motor based upon the coil temperature estimated by one of the devices of the tenth to fifteenth aspects.

A method for estimating DC motor coil temperature of a nineteenth aspect of the present invention calculates a resistance of a coil by compensating a voltage drop due to transistors and diodes included in an inverter.

A method for estimating DC motor coil temperature of a twentieth aspect of the present invention carries out compensation based upon a resistance value of power wirings when a coil temperature is estimated by using a value obtained through calibration.

A method for estimating DC motor coil temperature of a twenty-first aspect of the present invention detects a rotor position of a DC motor, calculates an inductance from the detected rotor position, and compensates a coil temperature calculated from a resistance of a coil, in correspondence with the calculated inductance.

A method for estimating DC motor coil temperature of a twenty-second aspect of the present invention detects the motor current at central timing of ON-time or OFF-time.

A method for estimating DC motor coil temperature of a twenty-third aspect of the present invention detects the motor current under a condition that a predetermined voltage is output by using a PAM circuitry.

A device for estimating DC motor coil temperature of a twenty-fourth aspect of the present invention employs means for calculating a resistance of a coil by compensating voltage drops due to transistors and diodes included in an inverter, and for estimating a temperature of the coil from the resistance of the coil, as the coil temperature estimating means.

A device for estimating DC motor coil temperature of a twenty-fifth aspect of the present invention employs means for carrying out compensation based upon a resistance value of power wirings when a coil temperature is estimated by using a value obtained through calibration, as the coil temperature estimating means.

A device for estimating DC motor coil temperature of a twenty-sixth aspect of the present invention employs means for detecting a rotor position of a DC motor, calculating an inductance from the detected rotor position, and compensating a coil temperature calculated from a resistance of a coil, in correspondence with the calculated inductance, as the coil temperature estimating means.

A device for estimating DC motor coil temperature of a twenty-seventh aspect of the present invention employs means for detecting the motor current at central timing of ON-time or OFF-time, as the coil temperature estimating means.

A device for estimating DC motor coil temperature of a twenty-eighth aspect of the present invention employs means for detecting the motor current under a condition that a predetermined voltage is output by using a PAM circuitry, as the coil temperature estimating means.

The invention of the first aspect has characteristic effect such that a temperature of a coil is estimated with accuracy without using a temperature sensor.

The invention of the second aspect has characteristic effect such that a resistance is calculated with accuracy even when passing through a zero-point is not assured, then estimation accuracy of a temperature of a coil is improved.

The invention of the third aspect has characteristic effect such that operation error is reduced, in addition to the effect of the first or second aspect of the present invention.

The invention of the fourth aspect has characteristic effect such that accuracy is improved by smoothing processing or the like, in addition to the effect of the second aspect of the present invention.

The invention of the fifth aspect has characteristic effect such that calculation accuracy is improved, in addition to the effect of one of the first to fourth aspects of the present invention.

The invention of the sixth aspect has characteristic effect such that a temperature in an interior of a compressor is estimated, in addition to the effect of one of the first to fifth aspects of the present invention.

The invention of the seventh aspect has characteristic effect such that a DC motor is controlled so as to make a temperature of the DC motor prior to starting to be a predetermined temperature with accuracy.

The invention of the eighth aspect has characteristic effect such that a time interval for retrying for starting a DC motor is set with accuracy.

The invention of the ninth aspect has characteristic effect such that driving and controlling method for retrying for starting a DC motor is set.

The invention of the tenth aspect has characteristic effect such that a temperature of a coil is estimated with accuracy without using a temperature sensor.

The invention of the eleventh aspect has characteristic effect such that a resistance is calculated with accuracy even when passing through a zero-point is not assured, then estimation accuracy of a temperature of a coil is improved.

The invention of the twelfth aspect has characteristic effect such that operation error is reduced, in addition to the effect of the tenth or eleventh aspect of the present invention.

The invention of the thirteenth aspect has characteristic effect such that accuracy is improved by smoothing processing or the like, in addition to the effect of the eleventh aspect of the present invention.

The invention of the fourteenth aspect has characteristic effect such that calculation accuracy is improved, in addition to the effect of one of the tenth to thirteenth aspects of the present invention.

The invention of the fifteenth aspect has characteristic effect such that a temperature in an interior of a compressor is estimated, in addition to the effect of one of the tenth to fourteenth aspects of the present invention.

The invention of the sixteenth aspect has characteristic effect such that a DC motor is controlled so as to make a temperature of the DC motor prior to starting to be a predetermined temperature with accuracy.

The invention of the seventeenth aspect has characteristic effect such that a time interval for retrying for starting a DC motor is set with accuracy.

The invention of the eighteenth aspect has characteristic effect such that driving and controlling method for retrying for starting a DC motor is set.

The invention of the nineteenth aspect has characteristic effect such that estimation accuracy is improved, in addition to the effect of one of the first to sixth aspects of the present invention.

The invention of the twentieth aspect has characteristic effect such that estimation accuracy is improved, in addition to the effect of the first aspect of the present invention.

The invention of the twenty-first aspect has characteristic effect such that estimation accuracy is improved, in addition to the effect of the nineteenth aspect of the present invention.

The invention of the twenty-second aspect has characteristic effect such that lowering in accuracy for current detection is suppressed even when an average current is not detected, in addition to the effect of one of the first to sixth aspects of the present invention.

The invention of the twenty-third aspect has characteristic effect such that chopping sound is vanished away, in addition to the effect of one of the first to sixth aspects of the present invention.

The invention of the twenty-fourth aspect has characteristic effect such that estimation accuracy is improved, in addition to the effect of one of the tenth to fifteenth aspects of the present invention.

The invention of the twenty-fifth aspect has characteristic effect such that estimation accuracy is improved, in addition to the effect of the tenth aspect of the present invention.

The invention of the twenty-sixth aspect has characteristic effect such that estimation accuracy is improved, in addition to the effect of the twenty-fourth aspect of the present invention.

The invention of the twenty-seventh aspect has characteristic effect such that lowering in accuracy for current detection is suppressed even when an average current is not detected, in addition to the effect of one of the tenth to fifteenth aspects of the present invention.

The invention of the twenty-eighth aspect has characteristic effect such that chopping sound is vanished away, in addition to the effect of one of the tenth to fifteenth aspects of the present invention.

DETAILED DESCRIPTION OF THE PREFERRED EMBODIMENTS

Hereinafter, referring to the attached drawings, we explain embodiments of a method for estimating DC motor coil temperature, a DC motor control method and their devices, in detail.

Figure 1:
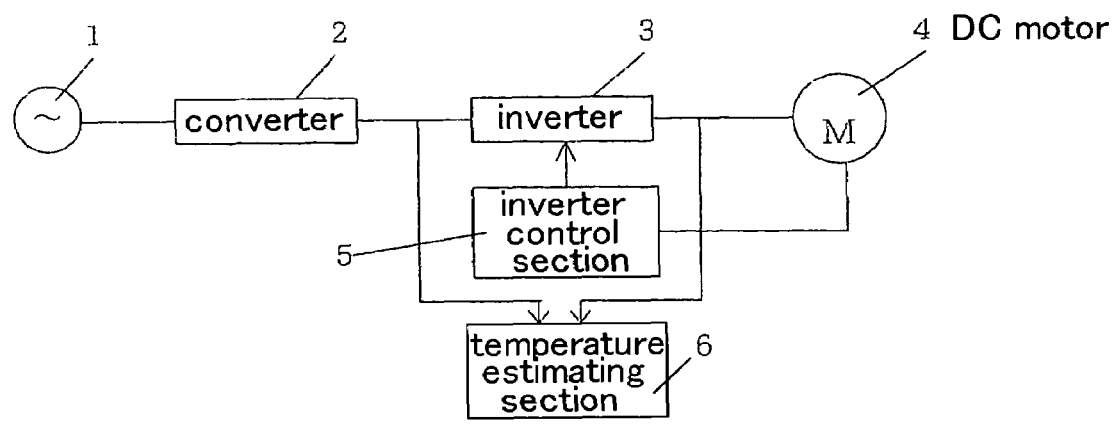
FIG. 1 is a block diagram schematically illustrating a DC motor driving device.

FIG. 1 is a block diagram schematically illustrating a DC motor driving device.

The DC motor driving device comprises a converter 2 input from a three-phase AC power source 1, an inverter 3 input a DC output of the converter 2, a DC motor 4 supplied an AC output of the inverter 3, and an inverter control section 5 for controlling the inverter 3 by taking a magnetic pole position of a rotor of the DC motor 4 as a standard. The DC motor driving device also comprises a temperature estimating section 6 for estimating a temperature of a coil of the DC motor 4.

Figure 2:
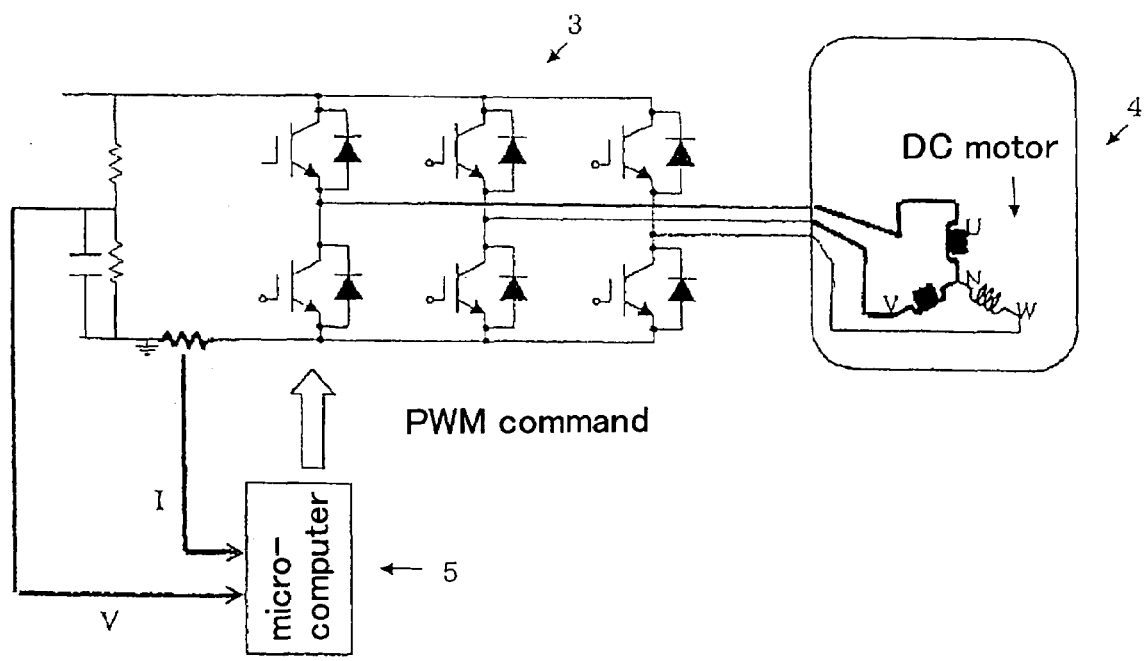
FIG. 2 is a block diagram illustrating an inverter control section of another configuration.

FIG. 2 is a block diagram illustrating an inverter control section 5 of another configuration.

The inverter control section 5 receives a current on DC-side of the inverter 3 and a divided voltage of a voltage on DC-side of the inverter 3 as inputs, and outputs a PWM command for controlling each switching transistor of the inverter 3. More specifically, operation of a DC motor is stated with a dq-axis model comprising a current, a voltage, a rotation angle, and an equipment constant. Therefore, a rotation angle is calculated from an actually measured current, voltage, and equipment constant based upon the model. The DC motor is driven with efficiency, accordingly, by outputting a PWM command according to the rotation angle and by supplying the PWM command to the inverter 3. Consequently, a magnetic pole position of a rotor of the DC motor 4 is not required to be received, in this case.

Figure 3:
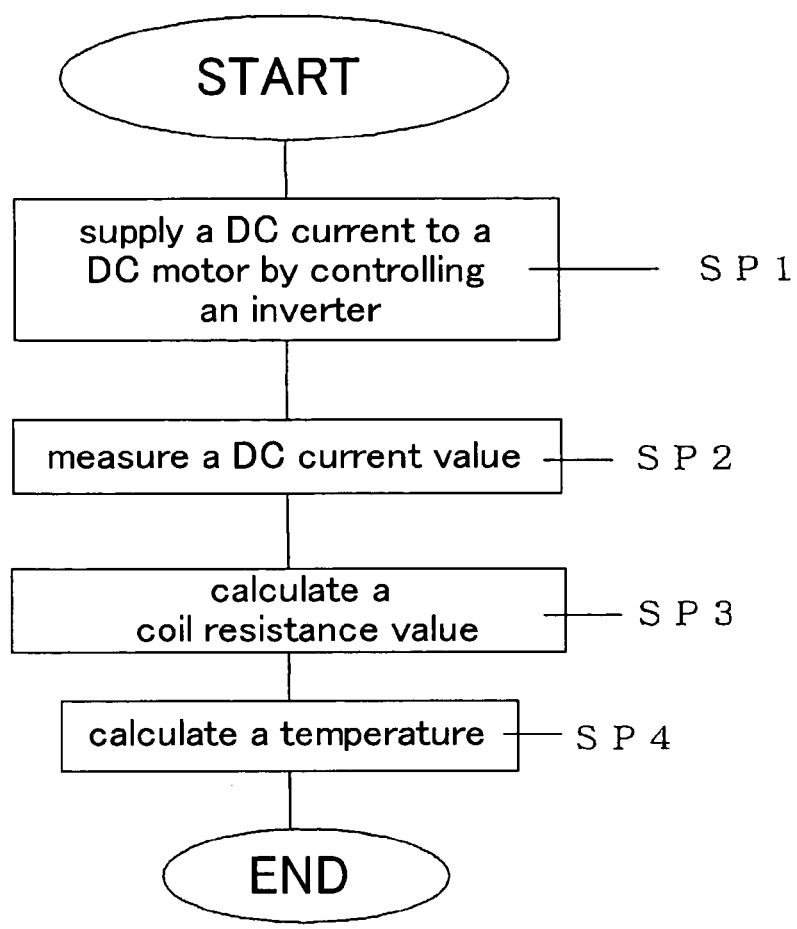
FIG. 3 is a flowchart useful in understanding processing of one example in a temperature estimating section.

FIG. 3 is a flowchart useful in understanding processing of one example in a temperature estimating section 6.

In step SP1, a DC current is output and supplied to the DC motor 4 by controlling the inverter 3. In step SP2, a DC current value is measured. In step SP3, a resistance of a coil of the DC motor 4 is calculated from the known DC voltage value and the measured DC current value. In step SP4, a temperature is calculated from the calculated resistance of the coil and the previously measured resistance-temperature characteristics.

Figure 4:
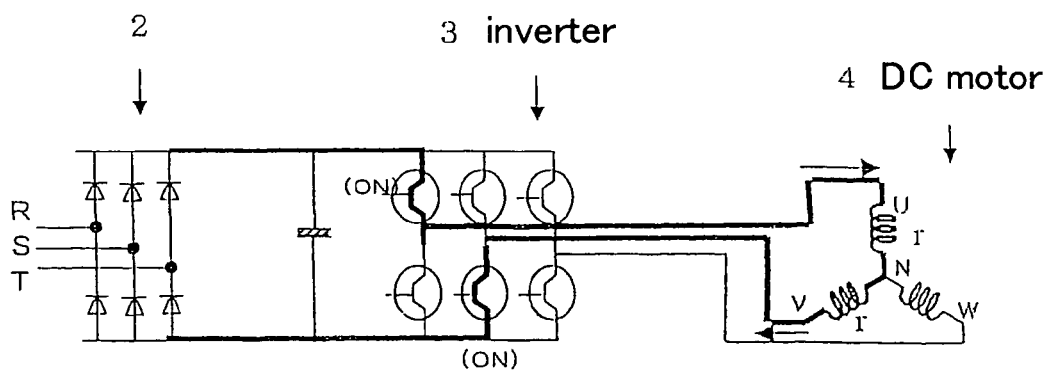
FIG. 4 is a diagram illustrating DC current supplying of one example.

Specifically, as is illustrated in FIG. 4 for example, a DC current is supplied to the u-phase coil and v-phase coil in Y-connection of the DC motor 4 by turning on the switching transistor on +-side of u-phase and the switching transistor on −-side of v-phase of the inverter 3.

In this case, it is preferable that the DC current is set so as not to rotate the rotor of the DC motor 4.

When the DC current is set as such, the resistance value of the coil (the resistance value of coils for two phases connected in series to one another) is calculated by carrying out the operation based upon the Ohm's law, for example. Then, the temperature of the coil is obtained by applying the calculated resistance value of the coil (specifically, ½ of the calculated resistance value of the coil) to the previously measured resistance-temperature characteristics.

The above description is made based upon the assumption that the voltage-current characteristics pass through the zero-point. In actual, the voltage-current characteristics may not pass through the zero-point. When the voltage-current characteristics do not pass through the zero-point, an error is included in the calculated resistance value when the resistance value of the coil is calculated in the above manner.

Figure 5:
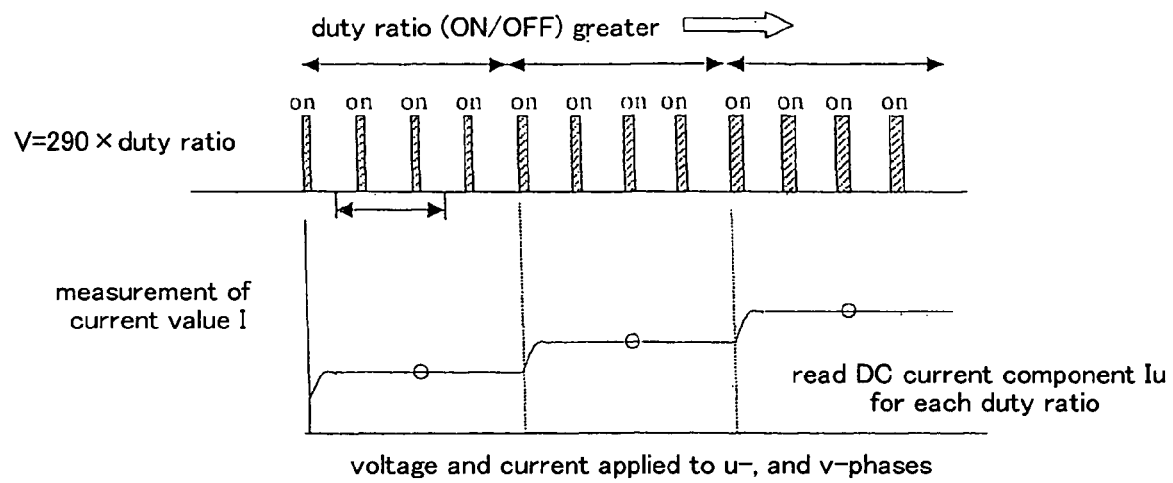
FIG. 5 is a diagram useful in understanding measurement of a DC current value in correspondence with each duty ratio, each duty ratio is obtained by changing the duty ratio.
Figure 6:
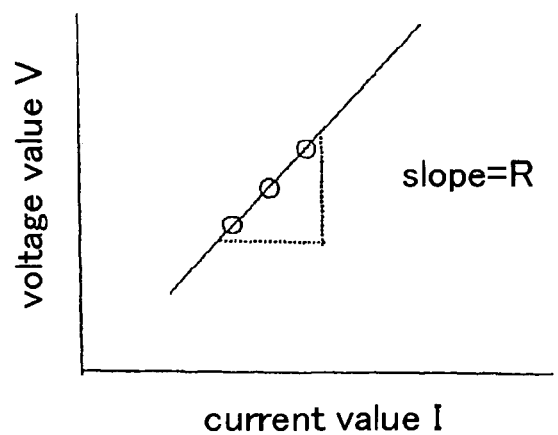
FIG. 6 is a diagram useful in understanding obtaining voltage-current characteristics based upon a plurality of measured DC current values and corresponding voltage values, and calculating a slope of the obtained voltage-current characteristics as a resistance of a coil.
Figure 7:
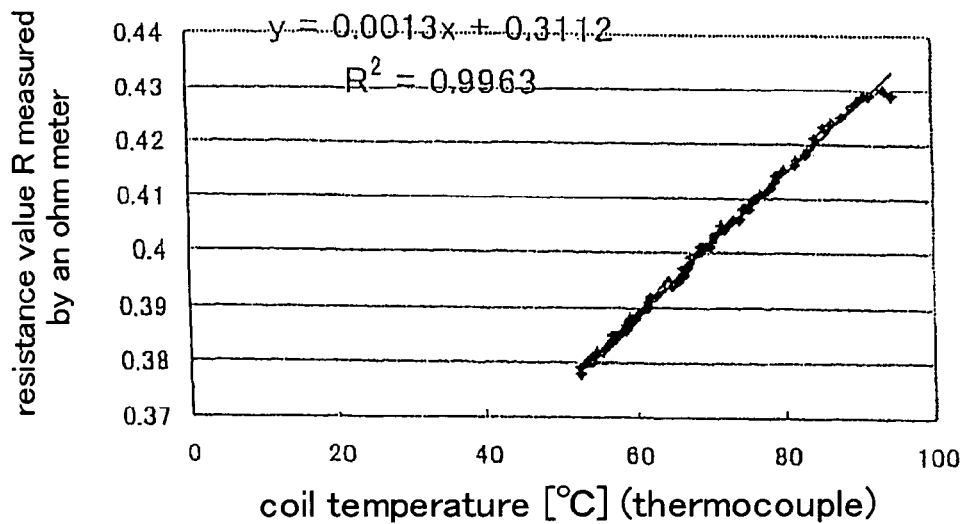
FIG. 7 is a diagram useful in understanding obtaining an accurate coil temperature by applying the obtained resistance of a coil to the previously obtained resistance-temperature characteristics.

To prevent such disadvantage from occurrence, as is illustrated in FIG. 5 for example, a duty ratio is changed, and a DC current value is measured in correspondence with each duty ratio. Thereafter, voltage-current characteristics are obtained based upon a plurality of measured DC current values and corresponding voltage values (for example, V0×duty ratio). Then, a slope of the obtained voltage-current characteristics is calculated as the resistance of the coil (refer to FIG. 6). Thereafter, an accurate temperature of the coil is obtained by applying the calculated resistance of the coil to the previously obtained resistance-temperature characteristics (refer to FIG. 7).

Figure 8:
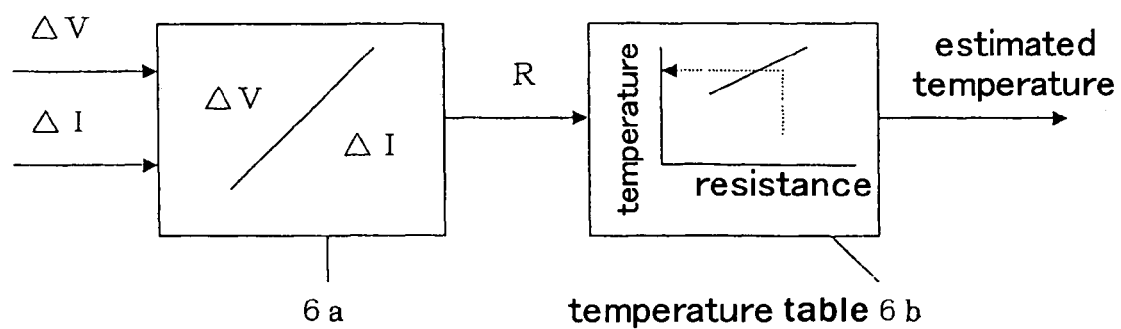
FIG. 8 is a block diagram illustrating an arrangement of a temperature estimating section.

FIG. 8 is a block diagram illustrating an arrangement of a temperature estimating section 6.

The temperature estimating section 6 comprises a resistance value calculating section 6a and a temperature table 6b. The resistance value calculating section 6a receives changing amount $\Delta I$ in current value and changing amount $\Delta V$ in voltage obtained by changing current and voltage in stepped manner, as is illustrated in FIG. 5, and calculates a resistance value R by carrying out the operation of $\Delta V/\Delta I$. The temperature table 6b receives the calculated resistance value R, obtains a temperature by using the previously determined temperature-resistance characteristics, and outputs the obtained temperature as the estimated temperature.

In those cases, it is preferable that a duration for each duty ratio is set to be equal to or greater than 0.5 seconds. Accuracy of the DC current value is improved by carrying out the averaging processing.

In the above cases, it is possible that application of voltage is carried out on rotational coordinate system or fixed coordinate system. It is preferable that application of voltage is carried out on fixed coordinate system and at an electrical angle which is constant. Operation error due to coordinate conversion is decreased.

In view of noise, it is preferable that a carrier frequency is raised, specifically the carrier frequency is determined to be equal to or greater than 1,000 Hz, because the carrier frequency is higher, the noise is smaller.

In the above cases, it is possible that detection of the DC current is carried out by using a shunt resistor. In this case, detection accuracy of the DC current is improved by employing a carrier frequency lower than that for the driving of the DC motor 4 and by carrying out detection (estimation) of the DC current.

More specifically, in specification of a DC motor generally used in an air conditioner, a resistance value is very small because the DC motor is intended to have high efficiency. Consequently, a condition with a very small duty is required for resistance value measurement. Therefore, a carrier frequency should be lowered so as not to be limited by the minimum time limit, for current measurement with a shunt resistor. Measurement accuracy for a DC current is improved by employing a carrier frequency which is lower than that for operating the DC motor 4 and by detecting (estimating) the DC current.

In view of noise, it is preferable that current measurement using DCCT (Direct Current Current Transformer) instead the current measurement using the shunt resistor so that the carrier frequency is raised so as to decrease noises, because the carrier frequency is higher, the noise is smaller.

Figure 9:
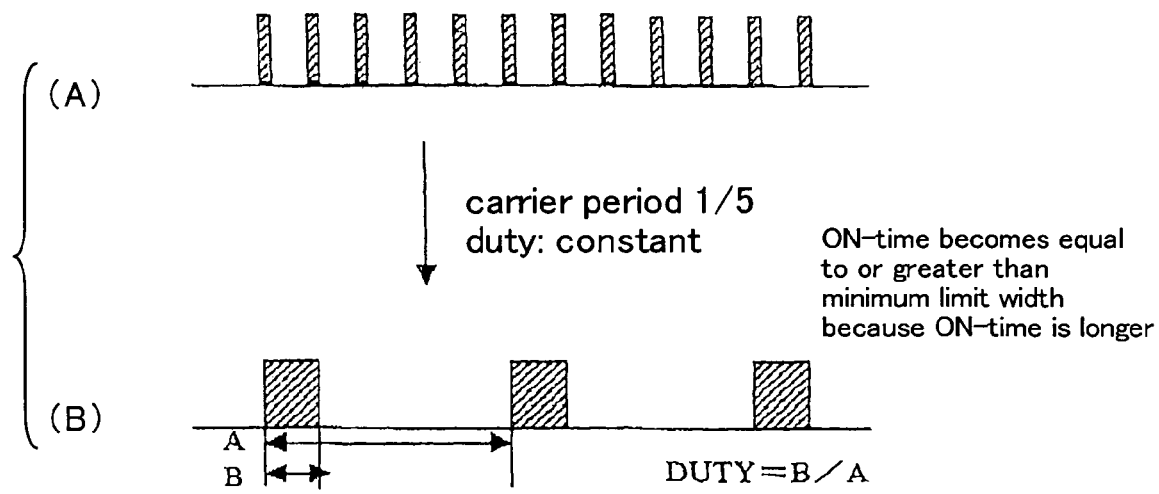
FIG. 9 is a diagram illustrating a waveform under a condition where a duty is not changed and a carrier frequency is decreased to ⅕.

For example, when the carrier frequency is set to ⅕ while the duty is maintained to be constant, for FIG. 9(A), ON-time becomes longer and is equal to or greater than minimum limiting width, as is illustrated in FIG. 9(B).

Next, simulation of one example for measuring a DC current value is described.

Figure 10:
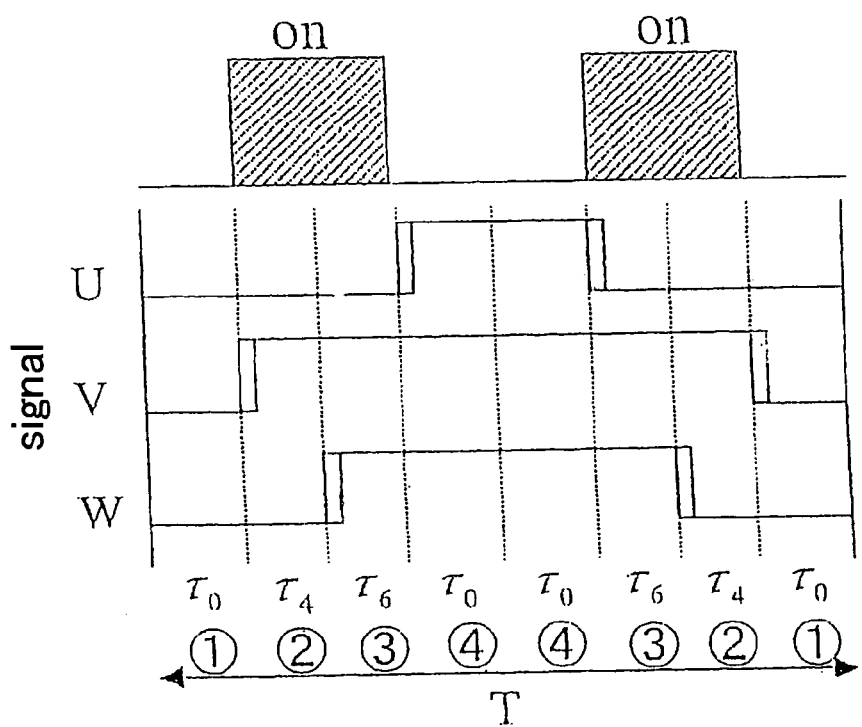
FIG. 10 is a diagram useful in understanding turning a current on for simulation of measurement of a DC current value.
Figure 11:
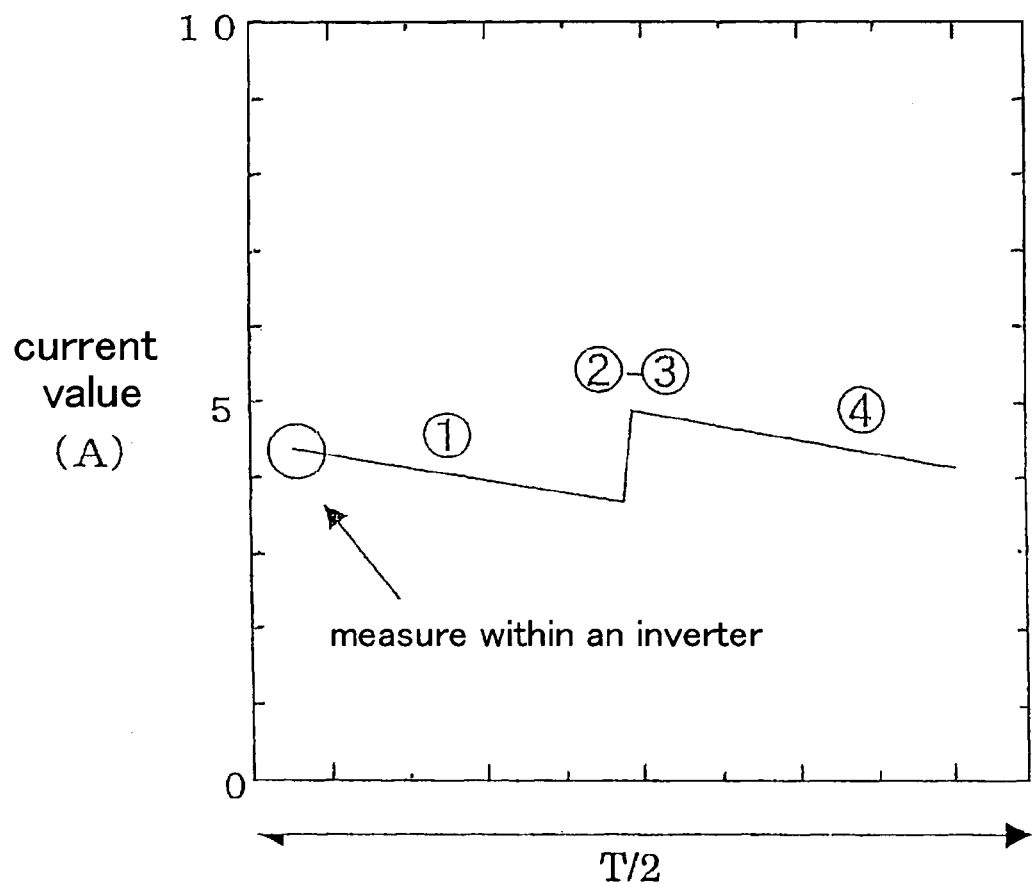
FIG. 11 is a diagram illustrating a DC current waveform.

When a u-phase voltage, a v-phase voltage and a w-phase voltage are set for a T time cycle, as is illustrated in FIG. 10, for example, a current is turned on according to those set voltages. Wherein the u-phase voltage is turned off, the v-phase voltage is turned on, and the w-phase voltage is turned on and is turned off, for a period when the current is turned on. The turned on period and the turned off period of the w-phase voltage are very short time, therefore the w-phase voltage may be deemed to be turned off.

And, a current waveform for T/2 time cycle becomes a waveform in which a current value is increased for a period when a current is turned on, and a current value is gradually decreased for the remaining period.

Therefore, a measurement value of a DC current is obtained by calculating an average value based upon the current waveform for T/2 time cycle.

In the above calculation of a coil resistance, voltage drops in diodes, and switching transistors are ignored. The calculation accuracy of a resistance of a coil is improved by taking those voltage drops into consideration.

A temperature in an interior of a compressor is easily obtained by taking a condition into consideration that a temperature of a coil is nearly the same to the temperature in the interior of the compressor, when the DC motor 4 is housed in the interior of the compressor, and drives the compressor.

Figure 12:
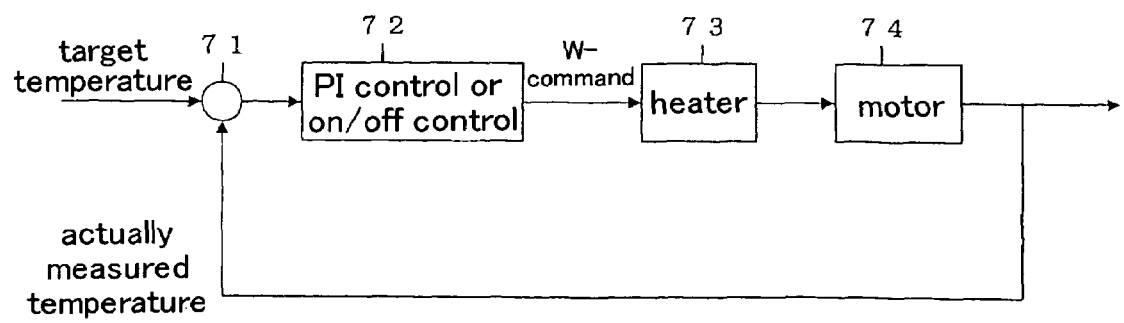
FIG. 12 is a block diagram illustrating an arrangement for controlling a motor temperature to become a predetermined temperature (target temperature) by using a temperature estimation value (actual temperature measurement value)

FIG. 12 is a block diagram illustrating an arrangement for controlling a motor temperature to become a predetermined temperature (target temperature) by using a temperature estimation value (actual temperature measurement value). The arrangement comprises a subtraction section 71 for calculating a difference between a target temperature and an actual measured temperature, a control section 72 for receiving the calculated difference temperature, for carrying out the PI controlling or on/off controlling, and for outputting a W-command (watt command), a heater 73 for operating by inputting the W-command so as to generate a heat quantity, and a DC motor 74 raised its temperature by the heater 73.

Therefore, a temperature of the DC motor 74 is raised to the target temperature.

Figure 13:
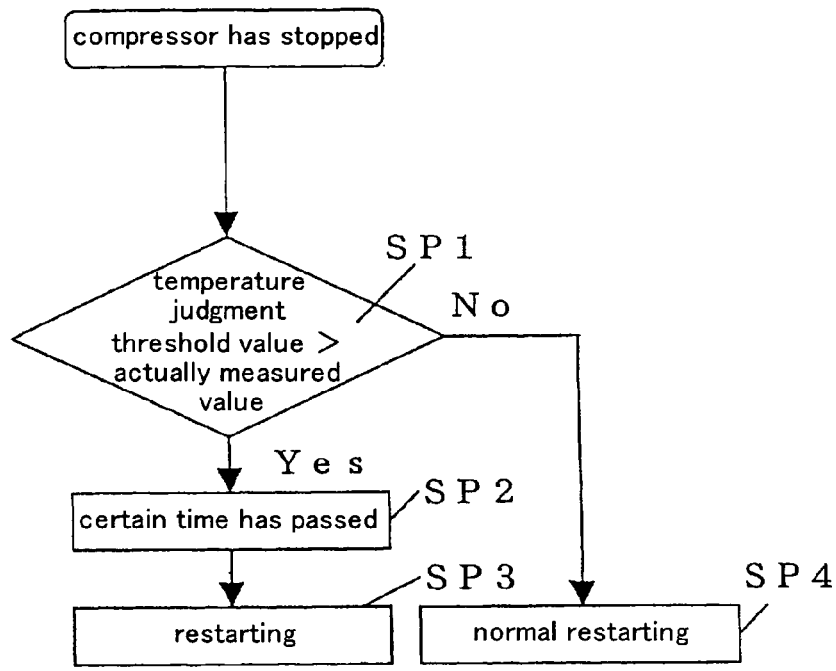
FIG. 13 is a flowchart useful in understanding a control method of a motor temperature when a compressor is stopped.

FIG. 13 is a flowchart useful in understanding a control method of a motor temperature when a compressor is stopped.

In step SP1, it is judged whether or not an actually measured temperature is lower than a threshold value. When it is judged that the actually measured temperature is lower than the threshold value, in step SP2, a heater is turned on (a heater is turned on electricity). In step SP3, it is waited till a certain time has passed. Then, the judgment in step SP1 is carried out again.

When it is judged that the actually measured temperature is equal to or higher than the threshold value, the judgment in step SP1 is carried out again.

Therefore, a temperature of the DC motor is controlled so as to become the threshold value.

Figure 14:
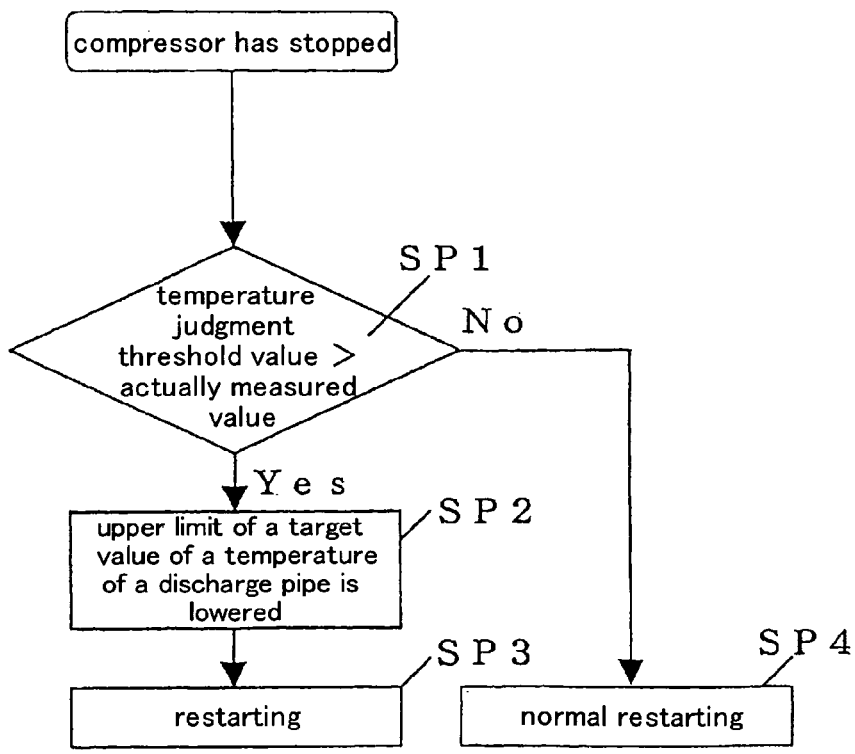
FIG. 14 is a flowchart useful in understanding processing from stopping to restarting of a compressor.

FIG. 14 is a flowchart useful in understanding processing from stopping to restarting of a compressor.

In step SP1, it is judged whether or not an actually measured temperature is lower than a threshold value. When it is judged that the actually measured temperature is lower than the threshold value, in step SP2, an upper limit of a target value of a discharge pipe temperature of a compressor is lowered. In step SP3, restarting operation is carried out.

When the compressor has stopped due to abnormal heating, for example, an operational range is narrowed down so as not to cause abnormal heating by lowering the upper limit of the target value of the discharge pipe temperature of the compressor. Then, the DC motor is restarted.

When the compressor has stopped due to an abnormal discharge pipe temperature, it is judged whether or not the interior of the compressor is under dangerous condition due to abnormal heating by measuring the temperature of the coil of the DC motor. Therefore, damage due to abnormal heating is avoided by determining timing till restarting in correspondence with the judgment result.

Figure 15:
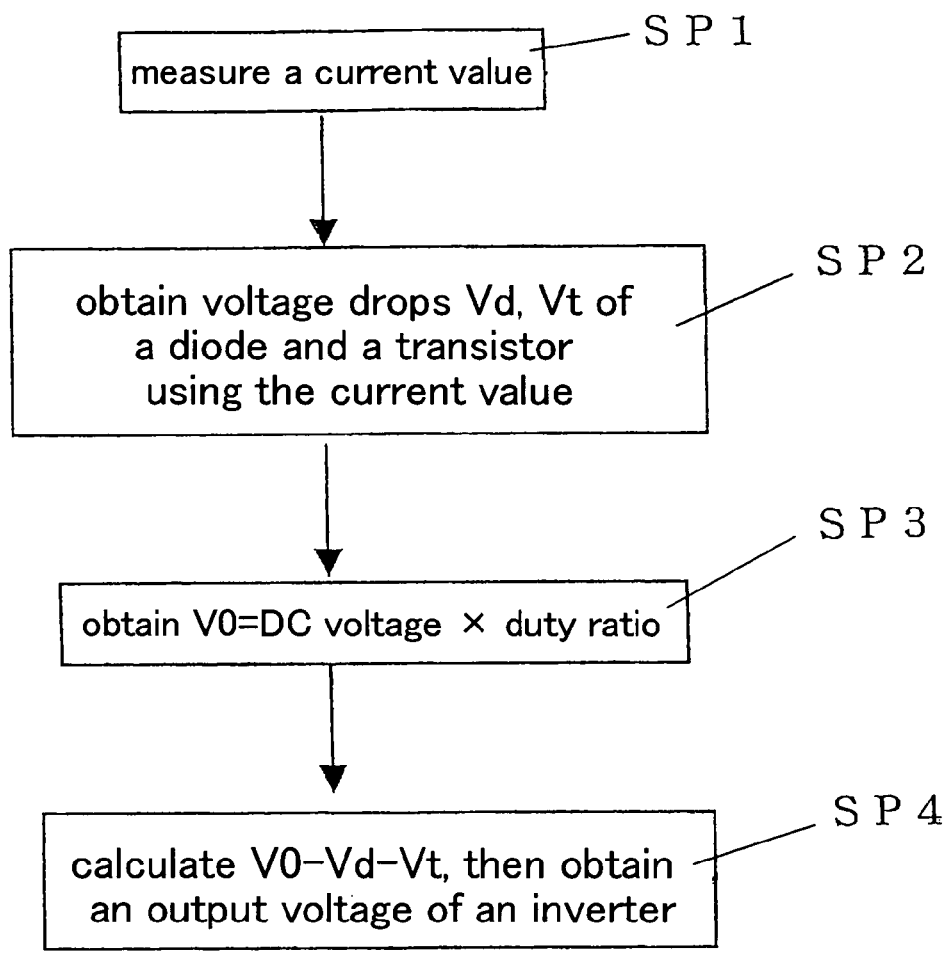
FIG. 15 is a flowchart useful in understanding processing for compensating voltage drops of transistors and diodes.

FIG. 15 is a flowchart useful in understanding processing for compensating voltage drops of transistors and diodes.

Figure 16:
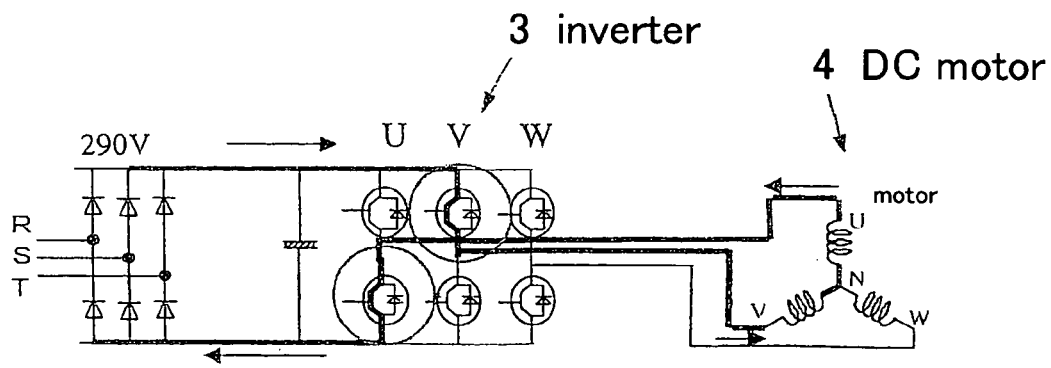
FIG. 16 is a diagram illustrating a current path of one example.

In step SP1, stator windings are turned on electricity by conducting a transistor of an upper arm of V-phase and a transistor of a lower arm of U-phase, as is illustrated in FIG. 16. A current value is measured under this condition.

Figure 17:
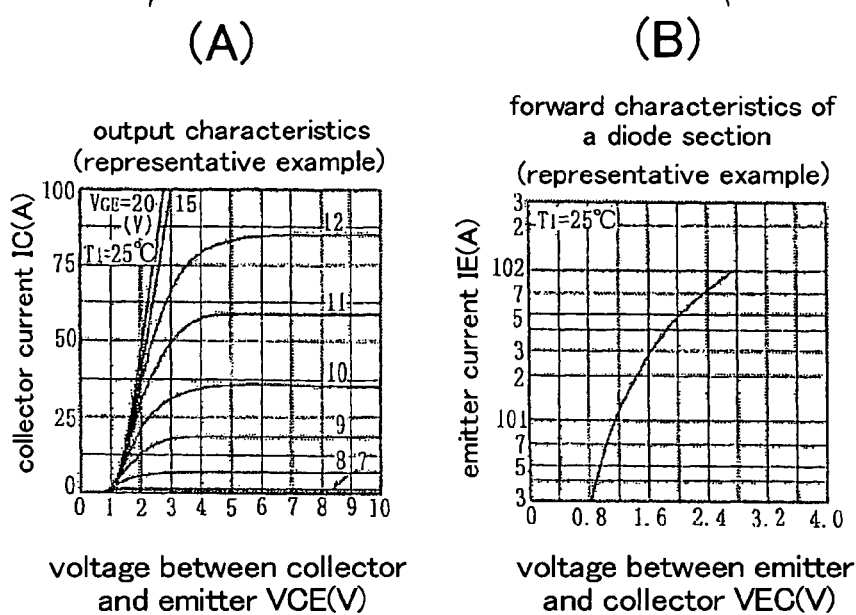
FIGS. 17 are diagrams illustrating rated characteristics of one example of a transistor and a diode.

In step SP2, a voltage drop Vt of the transistors and a voltage drop Vd of the diodes are calculated by using the measured current value and the rated characteristics illustrated in FIGS. 17(A) and 17(B).

In step SP3, a voltage V0 prior to correction is calculated by multiplying the duty ratio to the DC voltage.

In step SP4, an output voltage of the inverter is calculated by subtracting the voltage drop Vt of the transistors and the voltage drop Vd of the diodes from the voltage V0 prior to correction.

After the accurate output voltage of the inverter has obtained by the above manner, a resistance of the coil is calculated with accuracy, as is described above. Then a temperature of the coil is estimated with accuracy.

When a temperature T of a coil is calculated from a measured (or calculated) resistance value R of the coil, it is sufficient that the operation of T=a×R+b, wherein constants a and b are determined by calibration.

When it is supposed that a temperature at calibration is $t_0$, a measured resistance value at calibration is $R_{t0}$, a constant differing according to the model is $\alpha$, a resistance value (catalog value, measurement value, or the like) of a power line is $\beta$, the following equations are preferably employed so that the affection due to the resistance value of the power line is corrected so as to improve temperature estimation accuracy.

$a=\{1/(R_{t0}-\beta)\}\{(1/\alpha)+(t_0-20)\}$ $b=t_0-a \times R_{t0}$

Figure 18:
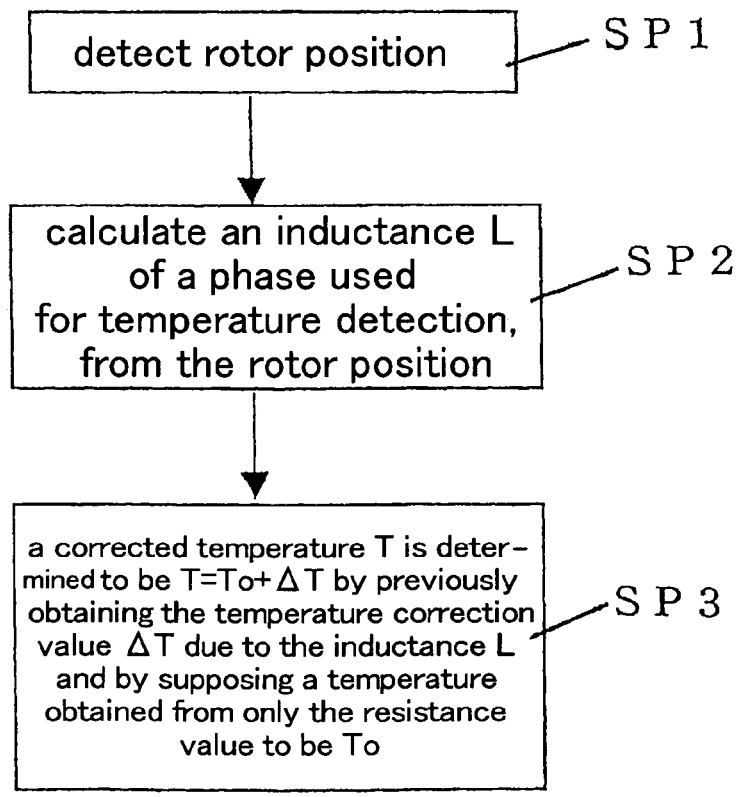
FIG. 18 is a flowchart useful in understanding temperature correction based upon an inductance determined by a rotor position.

FIG. 18 is a flowchart useful in understanding temperature correction based upon an inductance determined by a rotor position.

In step SP1, a rotor position of a DC motor is detected by using the conventional method.

In step SP2, an inductance L of a phase used for temperature detection is calculated by using the conventional method, from the detected rotor position.

Figure 19:
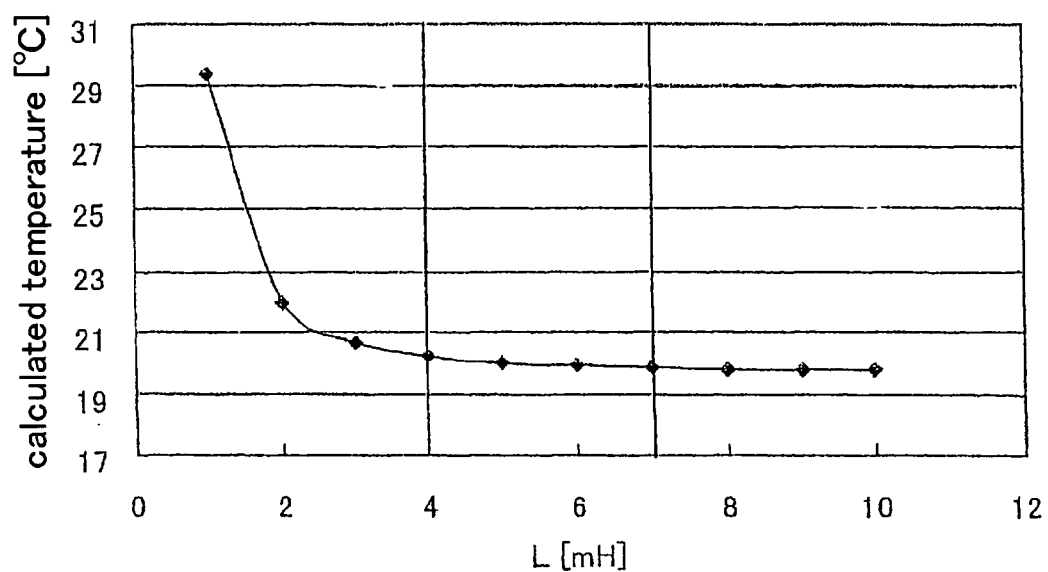
FIG. 19 is a diagram illustrating relationship of one example between an inductance and a calculated temperature.

In step SP3, a temperature is calculated by carrying out the operation of $T_0+\Delta T$ by previously obtaining the temperature correction value $\Delta T$ due to the inductance L and by supposing a temperature obtained from only the resistance value to be $T_0$, the temperature correction value $\Delta T$ being obtained by using the relationship between an inductance L and a calculated temperature, as is illustrated in FIG. 19.

For a DC motor, SRM motor, or the like which has a rotor having permanent magnets embedded in the interior of the rotor, an inductance L affects a current value such that a current amplitude becomes smaller when an inductance L becomes greater, and that a current amplitude becomes greater when an inductance L becomes smaller, so that an operation point on the rated characteristics is changed. Therefore, temperature estimation accuracy is improved by carrying out the correction processing described above.

Figure 20:
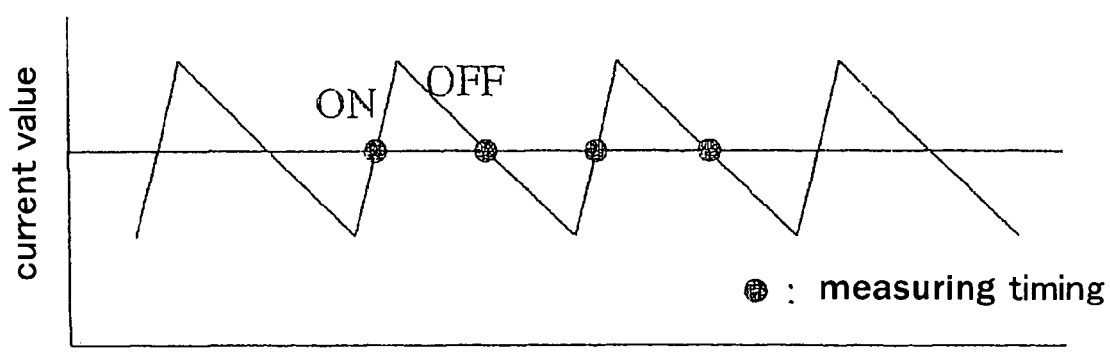
FIG. 20 is a diagram illustrating a current waveform at coil temperature measurement of one example.

For the above detection of a current value, it is preferable that current measurement is carried out at the center of ON-time or OFF-time (for example, at the timing at ½ of the ON-time or at the timing at ½ of the OFF-time), as is illustrated in FIG. 20, for example.

This current measurement is effective for a case where an average current is not measured. In this case, variation in current measurement is greatly suppressed.

Figure 21:
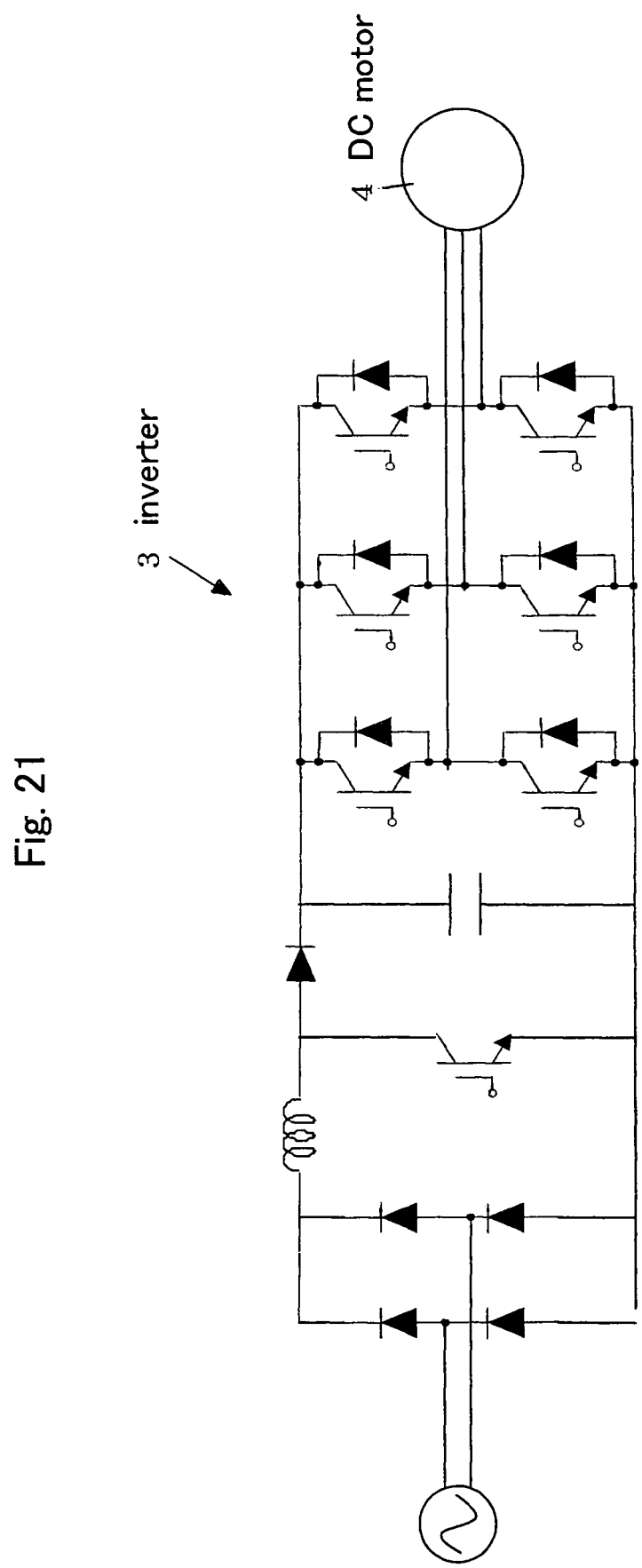
FIG. 21 is an electric circuitry diagram illustrating a motor driving device of one example which employs a PAM circuitry.

Further, it is preferable that current detection is carried out without switching of transistors of an inverter by outputting a voltage of about 5 volts by using a PAM (Pulse Amplitude Modulation) circuitry, as is illustrated in FIG. 21. In this case, chopping noise is prevented from generation.

What is claimed is:

1. A device for estimating DC motor coil temperature comprising:
   an inverter that supplies an output to a DC motor; and
   a coil temperature estimating section comprising
      a resistance value calculating section configured to calculate a resistance of a coil of the DC motor by using a motor current and a motor voltage,
      a temperature output section configured to output an estimated coil temperature by using resistance-temperature characteristics of the coil of the DC motor, and
      the resistance value calculating section being further configured to calculate the resistance of the coil of the DC motor by using a duty difference and a current difference by using a plurality of duty ratios.

2. A device for estimating DC motor coil temperature comprising:
   an inverter that supplies an output to a DC motor; and
   a coil temperature estimating section comprising
      a resistance value calculating section configured to calculate a resistance of a coil of the DC motor by using a motor current and a motor voltage, a temperature output section configured to output an estimated coil temperature by using resistance-temperature characteristics of the coil of the DC motor, and the coil temperature estimating section being further configured to employ a fixed coordinate system and apply a voltage with an electrical angle determined to be a constant angle.

3. The device for estimating DC motor coil temperature as set forth in claim 1, wherein the coil temperature estimating section further includes a constant duty maintaining section that is configured to maintain a constant duty for equal to or greater than at least 0.5 seconds.

4. A device for estimating DC motor coil temperature comprising:

an inverter that supplies an output to a DC motor; and a coil temperature estimating section comprising a resistance value calculating section configured to calculate a resistance of a coil of the DC motor by using a motor current and a motor voltage, a temperature output section configured to output an estimated coil temperature by using resistance-temperature characteristics of the coil of the DC motor, and the coil temperature estimating section being further configured to detect a motor current by using a shunt resistor, and calculate a coil resistance at a carrier frequency lower than that for driving the DC motor.

5. A DC motor control device for estimating DC motor coil temperature comprising:

an inverter that supplies an output to a DC motor;

a coil temperature estimating section comprising a resistance value calculating section configured to calculate a resistance of a coil of the DC motor by using a motor current and a motor voltage, and a temperature output section configured to output an estimated coil temperature by using resistance-temperature characteristics of the coil of the DC motor; and a control section configured to set a DC motor temperature to be a predetermined temperature based upon the estimated coil temperature.

6. A DC motor control device for estimating DC motor coil temperature comprising:

an inverter that supplies an output to a DC motor;

a coil temperature estimating section comprising a resistance value calculating section configured to calculate a resistance of a coil of the DC motor by using a motor current and a motor voltage, a temperature output section configured to output an estimated coil temperature by using resistance-temperature characteristics of the coil of the DC motor; and a control section configured to set a time interval until starting of the DC motor based upon the estimated coil temperature.

7. A device for estimating DC motor coil temperature comprising;

an inverter that supplies an output to a DC motor; and a coil temperature estimating section comprising a resistance value calculating section configured to calculate a resistance of a coil of the DC motor by using a motor current and a motor voltage, a temperature output section configured to output an estimated coil temperature by using resistance-temperature characteristics of the coil of the DC motor, and the coil temperature estimating section being further configured to calculate the resistance of the coil by compensating voltage drops due to transistors and diodes included in the inverter, and estimate the temperature of the coil from the resistance of the coil.

8. A device for estimating DC motor coil temperature comprising:

an inverter that supplies an output to a DC motor; and a coil temperature estimating section comprising a resistance value calculating section configured to calculate a resistance of a coil of the DC motor by using a motor current and a motor voltage, a temperature output section configured to output an estimated coil temperature by using resistance-temperature characteristics of the coil of the DC motor, and the coil temperature estimating section being further configured to detect a rotor position of the DC motor, calculate an inductance from the rotor position that was detected, and compensate the coil temperature calculated from the resistance of the coil, in correspondence with the inductance that was calculated.

9. The device for estimating DC motor coil temperature as set forth in one of claims 1, 2 and 4, wherein the coil temperature estimating section is further configured to detect the motor current at a central timing of an ON-time or an OFF-time.

10. The device for estimating DC motor coil temperature as set forth in one of claims 1, 2 and 4, wherein the coil temperature estimating section is further configured to detect the motor current under a condition that a predetermined voltage is output by using a PAM circuitry.

* * * * *